United States Patent Office 3,238,258
Patented Mar. 1, 1966

3,238,258
UNSATURATED NEW SULFONAMIDES
Hans Ulrich Daeniker, Basel, Switzerland, assignor to Ciba Corporation, a corporation of Delaware
No Drawing. Filed May 23, 1961, Ser. No. 111,922
Claims priority, application Switzerland, May 25, 1960, 5,996/60; Aug. 26, 1960, 9,659/60
3 Claims. (Cl. 260—556)

The present invention provides a process for the manufacture of new 3-substituted 1,4-endomethylene-$\Delta^5$-cyclohexene-2-sulfonamides the nitrogen atom of which carries at least one hydrogen atom, and salts thereof, that is to say of sulfonamides of the formula

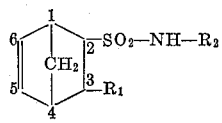

in which $R_1$ may represent a hydrocarbon radical, especially a lower alkyl, such as methyl or aryl, such as phenyl, and $R_2$ may represent hydrogen, a hydrocarbon radical or an acyl radical, and salts of these compounds. Preferably $R_2$ is hydrogen or a hydrocarbon radical, such as primarily a lower alkyl group, for example, methyl, ethyl, propyl, isopropyl, butyl, isobutyl, pentyl, or an acyl radical, such as for example benzoyl.

The 2- and 3-positioned substituents in the 1,4-endomethylene-$\Delta^5$-cyclohexene system may be of the endo or exo configuration.

The new compounds defined above possess valuable pharmacological properties and are therefore intended to be used as medicaments or as intermediates for the manufacture thereof. Inter alia they have a stimulating effect on the central nervous system.

In particular, compounds of the formula

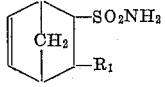

in which $R_1$ represents lower alkyl, have an analeptic effect and can be used as analeptics.

To obtain the new compounds a 3-substituted 1,4-endomethylene-$\Delta^5$-cyclohexene-2-sulfonamide or salt thereof is manufactured in the known manner.

For example, the new compounds can be obtained when 3-substituted 1,4-endomethylene-$\Delta^5$-cyclohexene-2-sulfonyl halides, especially chlorides are converted into amides the nitrogen atom of which still contains at least one hydrogen atom, and, if desired, in resulting sulfonamide derivatives the nitrogen of the free sulfonamide group is further mono-substituted and/or a salt is prepared, and/or, if desired, a resulting mixture of isomers is resolved into its components. The process can be illustrated for example by the following formulae

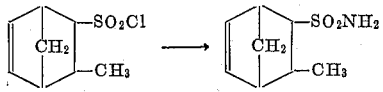

The manufacture of amides from sulfonic acids convertible into amides and their derivatives follows the usual practice. Thus, for example, a sulfonyl halide derivative can be reacted with ammonia or an amine—undiluted or diluted with an inert solvent—in the presence or absence of a basic condensing agent. The reaction is performed for example by adding a sulfonyl halide dropwise to liquid ammonia, or by reaction with an amine in an inert solvent.

A resulting sulfonamide derivative with a free sulfonamide group can be further mono-substituted at the nitrogen atom. More especially, such a sulfonamide derivative, capable of forming salts with bases, can be reacted with an electrophilic reagent. From 1,4-endomethylene-4-phenyl-$\Delta^5$-cyclohexene-2-sulfonamide, for example, there is obtained with benzoyl chloride in the presence of pyridine the corresponding N-benzoyl derivative.

As salts there may be mentioned those of sulfonamide derivatives whose nitrogen atom carries a free hydrogen atom which can be exchanged for a cation, for example the cation of an alkali metal, for example sodium.

The separation of a mixture of isomers obtained at any stage of the process into its constituents is carried out by known method, more especially by fractional crystallization, liquid/liquid distribution fractional elution chromatography on solid adsorbents or by gas chromatography. The separation will especially aim at the isolation of the endo-isomers and exo-isomers such as may occur in these cyclic systems, for example by the free or functionally converted sulfonic acid groups in position 2 and whose formulae may, for example, be as follows:

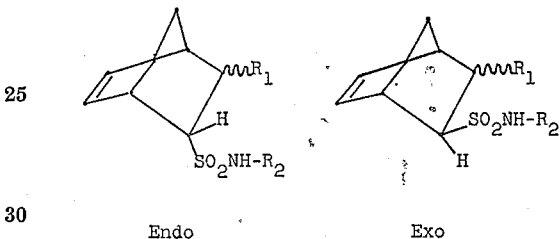

Endo          Exo

The starting materials are known or can be made by known methods. It is of advantage to use starting materials that give rise to the compounds described above as being specially preferred.

The 3-substituted 1,4-endomethylene-$\Delta^5$-cyclohexene-2-sulfonyl halides mentioned as starting material can be obtained, for example, by condensing cyclopentadiene with $\alpha,\beta$-unsaturated organic sulfonyl halides having at least three carbon atoms. As $\alpha,\beta$-unsaturated organic sulfonyl halides having at least three carbon atoms there may be mentioned in particular $\Delta^1$-propene-sulfonyl chloride and $\beta$-styryl sulfonyl chloride.

The invention further includes any variant of the process in which an intermediate obtained at any stage of the process is used as starting material and the remaining step or steps is/are carried out, or the process is discontinued at any stage thereof.

The reactions are carried out in the known manner in the presence or absence of diluents and/or condensing agents and/or catalysts, at the ordinary or an elevated temperature, under atmospheric or superatmospheric pressure.

The new compounds described above can be used as medicaments in human and veterinary medicine, for example in the form of pharmaceutical preparations that contain the aforementioned products in admixture with a pharmaceutical organic or inorganic excipient suitable for enteral, parenteral or local administration. Suitable excipients are substances that do not react with the new compounds such, for example, as gelatine, cholesterol, lactose, starch, magnesium stearate, talc, vegetable oils, benzyl alcohols, gums, polyalkylene glycols, white petroleum jelly or other known medicinal excipients. The pharmaceutical preparations may be, for example, tablets, dragees, powders, ointments, creams, suppositories, or in liquid form solutions, suspensions or emulsions. They may be sterilized and/or may contain assistants such as preserving, stabilizing, wetting or emulsifying agents. They may also contain further therapeutically valuable substances.

The invention is illustrated by the following examples without being limited thereto.

*Example 1*

25.3 g. of 1,4-endomethylene-3-methyl-Δ⁵-cyclohexene-2-sulfonyl chloride are stirred dropwise into 100 cc. of liquid ammonia which is then allowed to evaporate. The crystalline residue is distributed between water and chloroform. The dried and evaporated chloroform layer yields 24.5 grams of crystals which are recrystallized from isopropanol, to yield 1:4-endomethylene-3-methyl-Δ⁵-cyclohexene-2-sulfonamide as colorles crystals melting at 118–120° C., of the formula

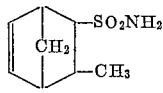

The starting material can be obtained, for example, as follows:

A solution of 20 g. of Δ¹-propenesulfonyl chloride and 20 g. of cyclopentadiene in 25 cc. of absolute benzene is treated with a trace of anhydrous aluminum chloride and some hydroquinone, and allowed to stand at room temperature in a sealed tube overnight and then heated at 120° C. for 20 hours. The resulting mixture is evaporated to dryness and the oily residue is distilled in a high vacuum, to yield 25.6 g. of 1,4-endomethylene-3-methyl-Δ⁵-cyclohexene-2-sulfonyl chloride boiling at 68–70° C. under a pressure of 0.2 mm. Hg.

*Example 2*

To a solution of 10 g. of ethylamine in 100 ml. of absolute ether are added dropwise while stirring and cooling, 20.6 g. of 1,4-endomethylene-3-methyl-Δ⁵-cyclohexene-2-sulfonyl chloride in 50 ml. of absolute ether. When the addition is complete, the mixture is allowed to stand at room temperature overnight. The reaction solution is then washed with dilute hydrochloric acid and water, dried and evaporated to dryness. 20.2 g. of a viscous oil are obtained which yields on crystallization from ether 1,4-endomethylene-3-methyl-Δ⁵-cyclohexene-2-sulfonic acid ethyl amide melting at 103–105° C. and having the formula

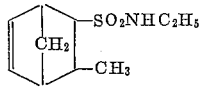

*Example 3*

To 500 ml. of liquid ammonia are added in portions while stirring 37.7 g. of 1,4-endomethylene-3-phenyl-Δ⁵-cyclohexene-2-sulfonyl chloride of melting point 76–78° C. and the resulting suspension is evaporated to dryness. The crystalline residue is mixed with 300 ml. of water, slightly heated and stirred, and then filtered with suction. The residue is recrystallized from 250 ml. of isopropanol, and 29.5 g. of 1,4-endomethylene-4-phenyl-Δ⁵-cyclohexene-2-sulfonamide obtained which melts at 144–146° C. and has the formula

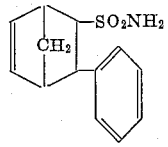

*Example 4*

To 10 g. of ethylamine in 200 ml. of absolute ether are added in portions while stirring and cooling 25 g. of 1,4 - endomethylene-3-phenyl-Δ⁵-cyclohexene-2-sulfonyl chloride, and the resulting suspension is boiled for 2 hours. At room temperature, 100 cc. of 2 N hydrochloric acid are added and the mixture stirred for half an hour. Cooling with ice is followed by filtering with suction. The solid residue formed is recrystallized twice from isopropanol to obtain 19.3 g. of 1,4-endomethylene-3-phenyl-Δ⁵-cyclohexene-2-sulfonyl ethyl amide of melting point 117–118° C. and of the formula

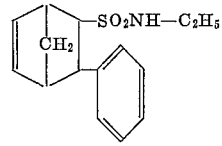

*Example 5*

12.6 g. of 1,4-endomethylene-3-phenyl-Δ⁵-cyclohexene-2-sulfonamide are dissolved in 50 ml. of absolute pyridine. To the resulting solution are added dropwise, while stirring and cooling, 7.7 g. of benzoyl chloride. The mixture is stirred for 1 hour at room temperature and for 2 hours at 60–70° C. After cooling, the reaction mass is taken up in chloroform and washed twice with dilute hydrochloric acid and once with water. The chloroformic solution is dried and evaporated to yield 19.5 g. of reddish crystals. The latter are recrystallized twice from methanol to obtain the 1,4-endomethylene-3-phenyl-Δ⁵-cyclohexene-2-sulfonyl-N-benzoylamide in the form of slightly yellowish crystals of melting point 200° C. and having the formula

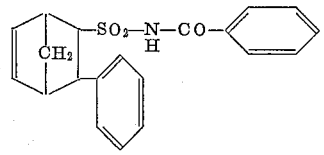

What is claimed is:

1. N - benzoyl - 1,4-endomethylene-3-phenyl-Δ⁵-cyclohexene-2-sulfonamide.
2. An alkali metal salt of 1,4-endomethylene 3-lower alkyl-Δ⁵-cyclohexene-2-sulfonamide.
3. An alkali metal salt of 1,4-endomethylene-3-lower alkyl-Δ⁵-cyclohexene-2-(N-lower alkyl-sulfonamide).

References Cited by the Examiner

UNITED STATES PATENTS 3,136,787  6/1964  Daeniker _____ 260—556 X

OTHER REFERENCES

Cheronis et al.: "Semimicro Qualitative Organic Analysis," pp. 179–181, Thomas J. Crowell Co., N.Y. (1947).

Rondestvedt et al.: J. Org. Chem., vol. 17, pp. 975–979 (1952).

Rondestvedt et al.: J. Am. Chem. Soc., vol. 73, pp. 5785–5787 (1951).

Snyder et al.: J. American Chem. Soc., vol. 73, pp. 3258–3260 (1951).

The Van Nostrand Chemist's Dictionary, page 19, D. Van Nostrand Co. (N.Y.) (1953).

Truce et al.: J. Am. Chem. Soc., vol 76, pp. 3230 to 3232 (1954).

WALTER A. MODANCE, *Primary Examiner.*

IRVING MARCUS, JOHN D. RANDOLPH, E. E. BERG, *Assistant Examiners.*